United States Patent
Carnahan

(10) Patent No.: US 9,663,151 B1
(45) Date of Patent: May 30, 2017

(54) TRUCK RACK SYSTEM

(71) Applicant: Hen Carnahan, Seattle, WA (US)

(72) Inventor: Hen Carnahan, Seattle, WA (US)

( * ) Notice: Subject to any disclaimer, the term of this patent is extended or adjusted under 35 U.S.C. 154(b) by 0 days.

(21) Appl. No.: 15/218,916

(22) Filed: Jul. 25, 2016

(51) Int. Cl.
*B62D 33/02* (2006.01)
*B60R 9/00* (2006.01)

(52) U.S. Cl.
CPC .................. *B62D 33/0207* (2013.01)

(58) Field of Classification Search
CPC ...... B62D 33/02; B62D 33/0207; B60R 9/00; B60R 11/00
USPC .................................................. 224/402, 405
See application file for complete search history.

(56) References Cited

U.S. PATENT DOCUMENTS

| | | | |
|---|---|---|---|
| 3,239,115 A * | 3/1966 | Bott | B60R 9/12 |
| | | | 224/315 |
| 4,326,655 A * | 4/1982 | Gradek | B60R 9/12 |
| | | | 211/70.5 |
| 4,354,625 A * | 10/1982 | Peoples | B60R 9/058 |
| | | | 224/325 |
| 4,630,990 A | 12/1986 | Whiting | |
| 4,659,131 A | 4/1987 | Flournoy, Jr. | |
| 4,957,400 A | 9/1990 | Karp | |
| 4,984,837 A | 1/1991 | Dise | |
| 4,995,538 A * | 2/1991 | Marengo | B60R 9/058 |
| | | | 224/315 |
| 5,115,955 A * | 5/1992 | Dallaire | B60R 9/12 |
| | | | 224/315 |
| 5,769,291 A * | 6/1998 | Chasan | B60R 9/08 |
| | | | 224/318 |
| 5,862,964 A * | 1/1999 | Moliner | B60R 9/058 |
| | | | 224/322 |
| 5,988,471 A * | 11/1999 | Lundgren | B60R 9/058 |
| | | | 224/309 |
| 6,315,327 B1 * | 11/2001 | Woolsey | B60R 11/00 |
| | | | 280/770 |
| 6,454,149 B1 | 9/2002 | Moore | |
| 6,695,556 B2 | 2/2004 | Addy | |
| 6,729,513 B2 * | 5/2004 | Kmita | B60R 9/00 |
| | | | 224/316 |
| 6,983,968 B2 | 1/2006 | Brauer et al. | |
| 7,097,409 B2 | 8/2006 | Richter | |
| 7,913,885 B2 | 3/2011 | Long | |
| D635,909 S | 4/2011 | Moore | |
| 8,517,237 B1 * | 8/2013 | Barber | B60R 9/05 |
| | | | 224/316 |
| 9,333,921 B1 * | 5/2016 | Greene | B60R 11/00 |
| 9,346,410 B2 * | 5/2016 | Godin | B62D 35/001 |
| 2006/0012096 A1 * | 1/2006 | Geldert | B25B 5/163 |
| | | | 269/203 |
| 2006/0065686 A1 * | 3/2006 | Furtado | B60R 9/048 |
| | | | 224/319 |
| 2007/0181622 A1 * | 8/2007 | Rocchio | B60R 9/058 |
| | | | 224/324 |

FOREIGN PATENT DOCUMENTS

AU 200189357 B2 * 5/2002

* cited by examiner

*Primary Examiner* — Brian D Nash

(57) ABSTRACT

A truck rack system for transporting an elongated object in a vehicle includes a vehicle that has a cab and a bed. A rack is positioned on the cab. A pad is coupled to the rack and the pad may support an object. Thus, the vehicle may carry the object. A fastener is coupled to the rack. The fastener engages the roof such that the rack is removably retained on the roof.

5 Claims, 5 Drawing Sheets

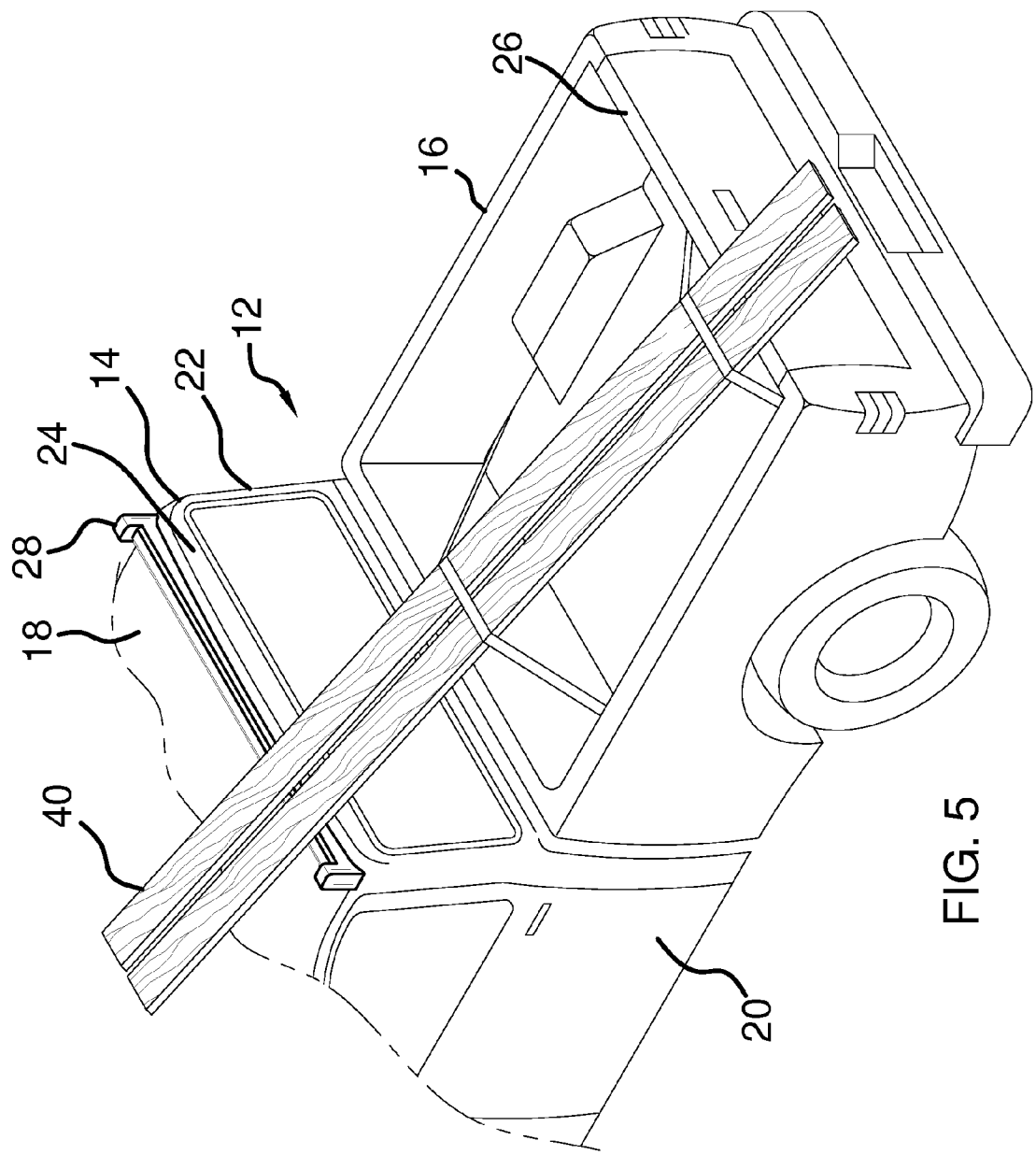

TRUCK RACK SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIE THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to rack devices and more particularly pertains to a new rack device for carrying an elongated object in a vehicle.

BRIEF SUMMARY OF THE INVENTION

An embodiment of the disclosure meets the needs presented above by generally comprising a vehicle that has a cab and a bed. A rack is positioned on the cab. A pad is coupled to the rack and the pad may support an object. Thus, the vehicle may carry the object. A fastener is coupled to the rack. The fastener engages the roof such that the rack is removably retained on the roof.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 5 is a perspective in-use view of an embodiment of the disclosure.

DETAILED DESCRIPTION OF THE INVENTION

Figure 1:
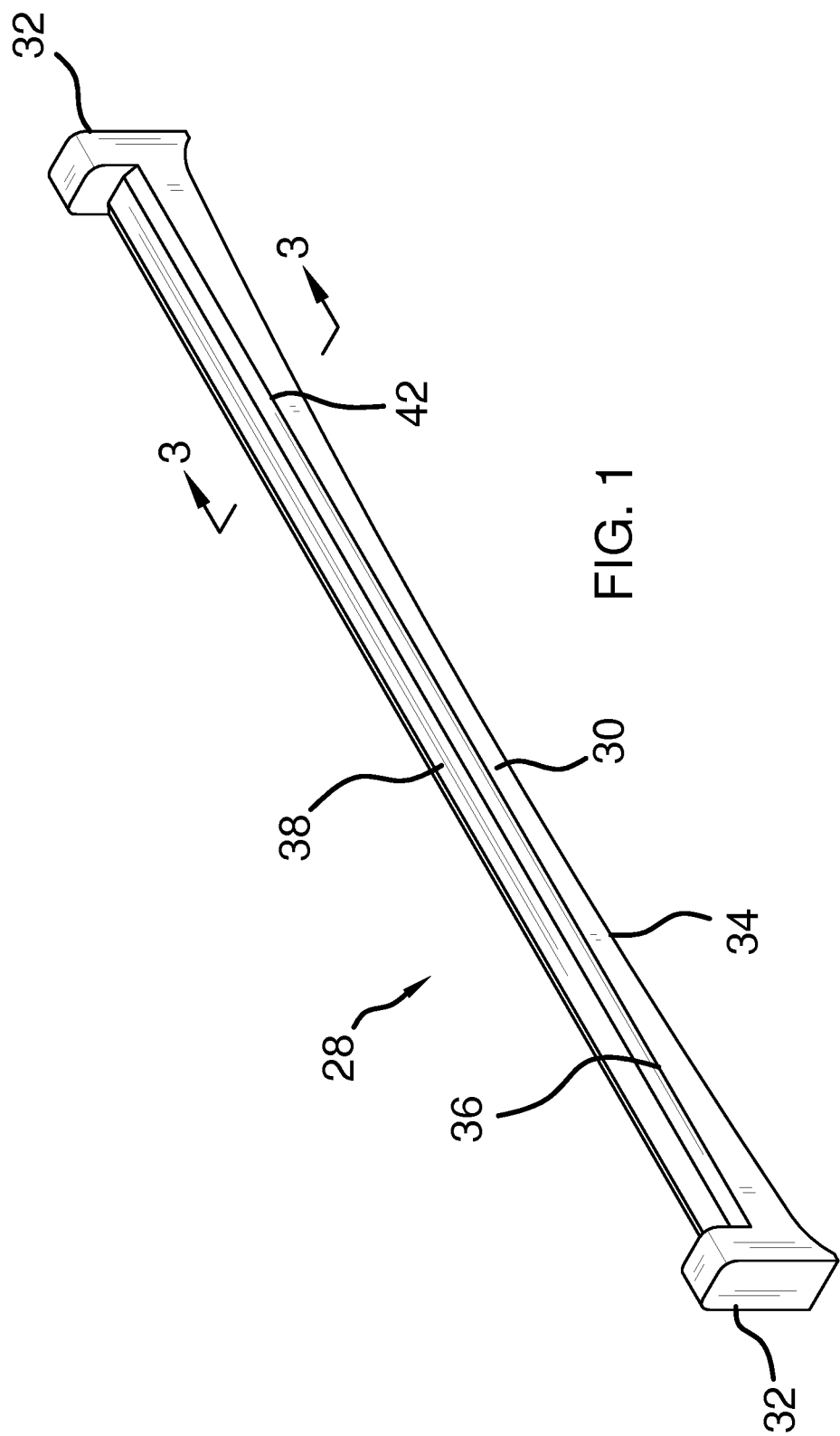
FIG. 1 is a top perspective view of a rack of a truck rack system according to an embodiment of the disclosure.
Figure 2:
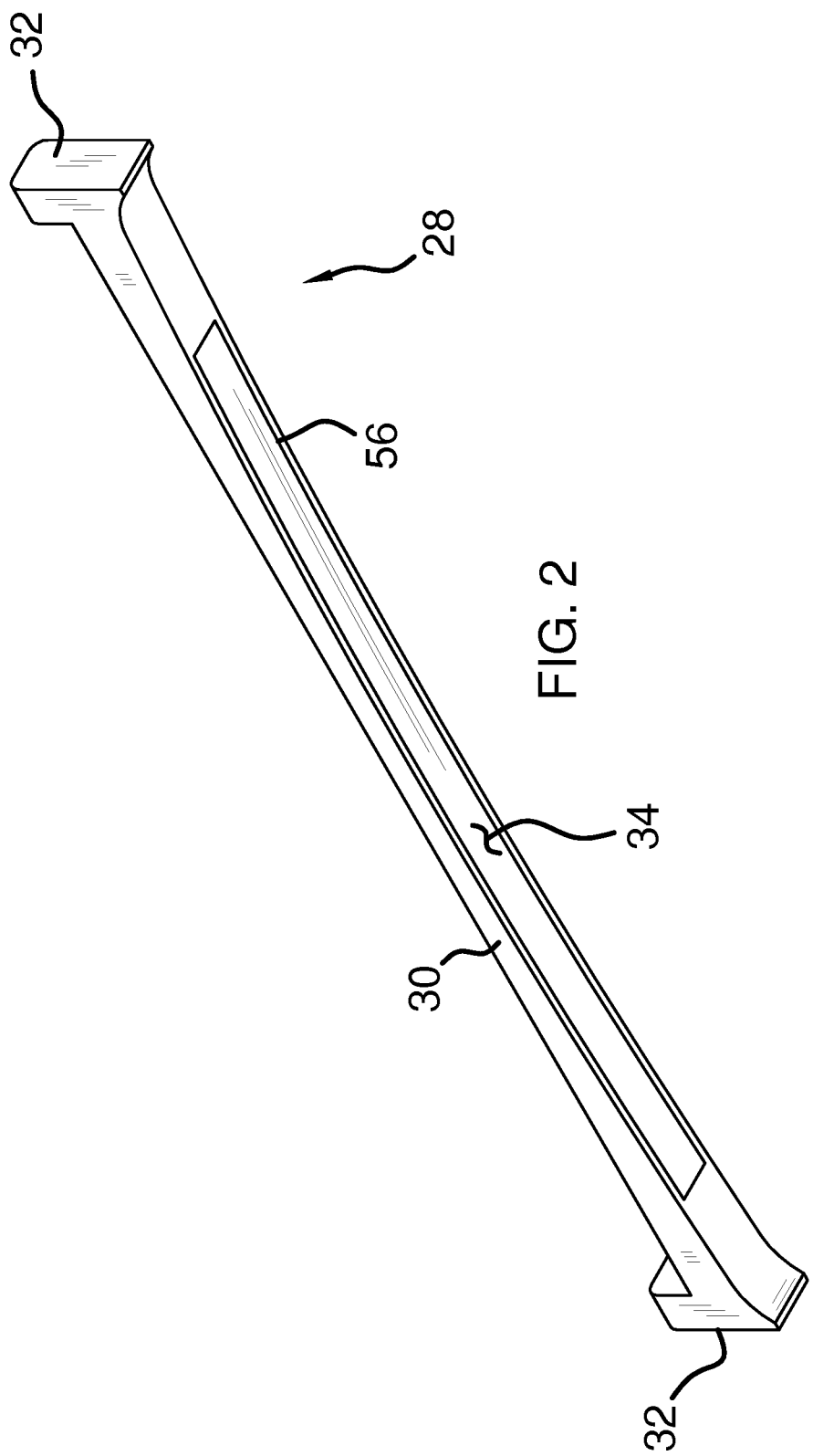
FIG. 2 is a bottom perspective view of rack of an embodiment of the disclosure.
Figure 3:
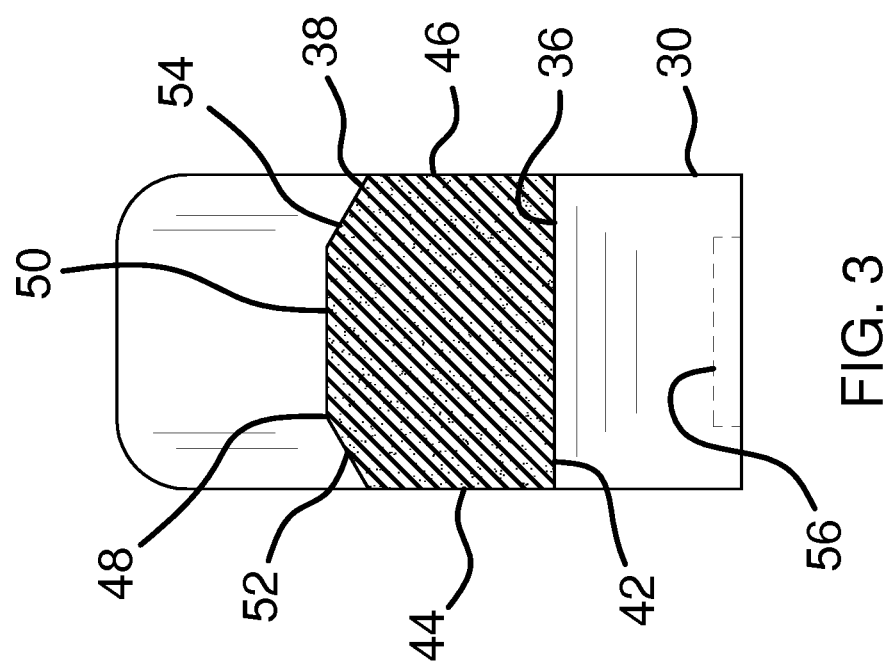
FIG. 3 is a cross sectional view taken along line 3-3 of FIG. 1 of an embodiment of the disclosure.
Figure 4:
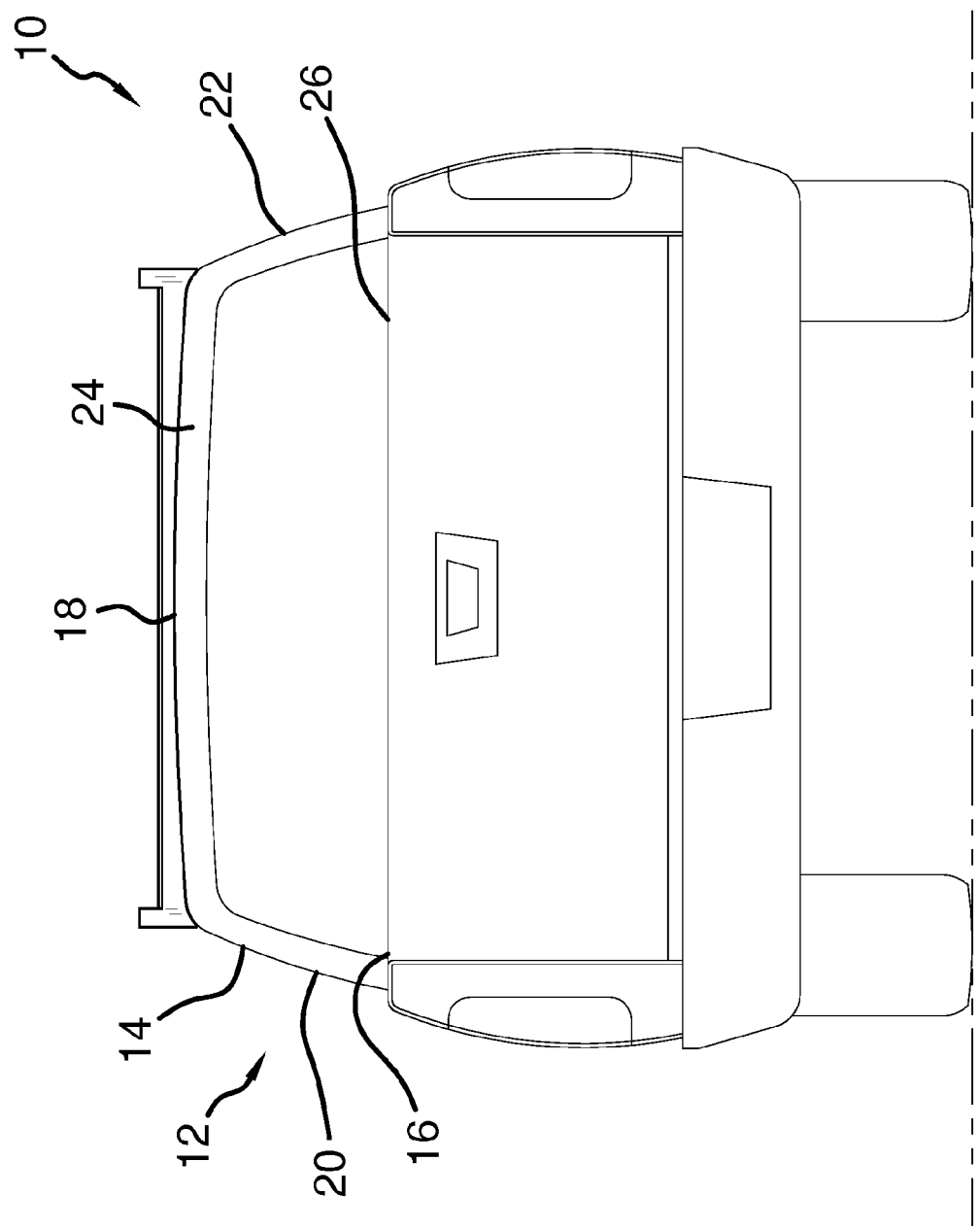
FIG. 4 is a back in-use view of an embodiment of the disclosure.

With reference now to the drawings, and in particular to FIGS. 1 through 5 thereof, a new rack device embodying the principles and concepts of an embodiment of the disclosure and generally designated by the reference numeral 10 will be described.

As best illustrated in FIGS. 1 through 5, the truck rack system 10 generally comprises a vehicle 12 that has a cab 14 and a bed 16. The cab 14 has a roof 18, a first lateral side 20, a second lateral side 22 and a rear side 24. The vehicle 12 may be a pickup or the like. The bed 16 may have a tailgate 26.

A rack 28 is provided. The rack 28 is positioned on the cab 14. The rack 28 has a central member 30 extending between a pair of end members 32. The end members 32 are spaced apart from each other.

The rack 28 has a bottom surface 34 and the bottom surface 34 is concavely arcuate between each of the end members 32. The bottom surface 34 abuts the roof 18. Thus, the bottom surface 34 follows a contour of the roof 18 between the first lateral side 20 and the second lateral side 22. The central member 30 has a top surface 36 and the rack 28 is aligned with the rear side 24 of the cab 14.

A pad 38 is provided. The pad 38 is coupled to the rack 28. The pad 38 supports an object 40 when the object 40 is positioned on the rack 28. Thus, the vehicle 12 may carry the object 40. The object 40 may be a ladder or other elongated object 40. Moreover, the object 40 may have a length that exceeds a length of the bed 16. The pad 38 is comprised of a resiliently compressible material such as rubber or the like.

The pad 38 has a lower side 42, a front side 44, a back side 46 and a top side 48. The top side 48 has a central surface 50, a forward surface 52 and a rearward surface 54. The forward surface 52 angles downwardly between the central surface 50 and the front side 44 of the pad 38. The rearward surface 54 angles downwardly between the central surface 50 and the back side 46 of the pad 38. The central surface 50 lies on a plane that is coplanar with the lower side 42. The lower side 42 is coupled to the top surface 36 of the central member 30. Moreover, the pad 38 extends between each of the end members 32.

A fastener 56 is coupled to the rack 28. The fastener 56 engages the roof 18 to removably retain the rack 28 on the roof 18. The fastener 56 may comprise a magnet or the like. The fastener 56 is recessed into the bottom surface 34 of the rack 28. The fastener 56 extends substantially between each of the end members 32.

In use, the rack 28 is positioned on the roof 18 of the cab 14 to extend between the first and second lateral side 22s of the cab 14. The fastener 56 engages the roof 18 to retain the rack 28 on the cab 14. The object 40 is positioned on the pad 38 to extend between the rack 28 and the tailgate 26. Thus, the rack 28 inhibits the object 40 from scratching or otherwise damaging the roof 18. The object 40 is secured to the bed 16 with straps or the like. The vehicle 12 is driven to transport the object 40.

With respect to the above description then, it is to be realized that the optimum dimensional relationships for the parts of an embodiment enabled by the disclosure, to include variations in size, materials, shape, form, function and manner of operation, system and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A truck rack system comprising:
   a vehicle having a cab and a bed;
   a rack being positioned on said cab;
   a pad being coupled to said rack wherein said pad is configured to support an object thereby facilitating said vehicle to carry the object; and
   a fastener being coupled to said rack, said fastener engaging said roof such that said rack is removably retained on said roof;
   wherein said pad has a lower side, a front side, a back side and a top side, said top side having a central surface, a forward surface and a rearward surface, said forward surface angling downwardly between said central surface and said front side of said pad, said rearward surface angling downwardly between said central surface and said back side of said pad, said central surface lying on a plane being coplanar with said lower side;
   said rack having a central member, said central member having a top surface; and
   said lower side being coupled to said top surface of said central member having said pad extending continuously between a pair of end members.

2. The system according to claim 1, wherein said rack has said central member extending between said pair of end members, said end members being spaced apart from each other, said rack having a bottom surface, said bottom surface being concavely arcuate between each of said end members.

3. The system according to claim 2, wherein:
   said cab has a roof, a first lateral side, a second lateral side and a rear side; and
   said bottom surface abutting said roof such that said bottom surface follows a contour of said roof between said first lateral side and said second lateral side, said central member having said top surface, said rack being aligned with said rear side of said cab.

4. The system according to claim 2, wherein said fastener is recessed into said bottom surface of said rack, said fastener extending substantially between each of said end members.

5. A truck rack system comprising:
   a vehicle having a cab and a bed, said cab having a roof, a first lateral side, a second lateral side and a rear side;
   a rack being positioned on said cab, said rack having a central member extending between a pair of end members, said end members being spaced apart from each other, said rack having a bottom surface, said bottom surface being concavely arcuate between each of said end members, said bottom surface abutting said roof such that said bottom surface follows a contour of said roof between said first lateral side and said second lateral side, said central member having a top surface, said rack being aligned with said rear side of said cab;
   a pad being coupled to said rack wherein said pad is configured to support an object thereby facilitating said vehicle to carry the object, said pad having a lower side, a front side, a back side and a top side, said top side having a central surface, a forward surface and a rearward surface, said forward surface angling downwardly between said central surface and said front side of said pad, said rearward surface angling downwardly between said central surface and said back side of said pad, said central surface lying on a plane being coplanar with said lower side, said lower side being coupled to said top surface of said central member having said pad extending continuously between each of said end members; and
   a fastener being coupled to said rack, said fastener engaging said roof such that said rack is removably retained on said roof, said fastener being recessed into said bottom surface of said rack, said fastener extending substantially between each of said end members.

* * * * *